United States Patent
Geshel et al.

(10) Patent No.: US 7,155,052 B2
(45) Date of Patent: Dec. 26, 2006

(54) METHOD FOR PATTERN INSPECTION

(75) Inventors: Mark Geshel, Kfar-Sava (IL); Niv Shmueli, Tel Aviv (IL); Gideon Friedmann, Mevaseret Zion (IL); Orna Bregman-Amitai, Tel Aviv (IL)

(73) Assignee: Tokyo Seimitsu (Israel) Ltd, Tokyo (JP)

( * ) Notice: Subject to any disclaimer, the term of this patent is extended or adjusted under 35 U.S.C. 154(b) by 695 days.

(21) Appl. No.: 10/164,412

(22) Filed: Jun. 10, 2002

(65) Prior Publication Data

US 2003/0228050 A1 Dec. 11, 2003

(51) Int. Cl.
*G06K 9/00* (2006.01)

(52) U.S. Cl. ............... 382/144; 382/145; 382/141; 382/147; 382/149; 382/151; 348/86; 348/87; 348/124

(58) Field of Classification Search ........... 382/141, 382/144, 145, 147, 149, 151, 198, 282; 348/86, 348/87, 124
See application file for complete search history.

(56) References Cited

U.S. PATENT DOCUMENTS

| | | | |
|---|---|---|---|
| 4,247,203 A | 1/1981 | Levy et al. | |
| 4,532,650 A | 7/1985 | Wihl et al. | |
| 4,579,455 A | 4/1986 | Levy et al. | |
| 4,633,504 A | 12/1986 | Wihl | |
| 4,805,123 A | 2/1989 | Specht et al. | |
| 4,926,489 A | 5/1990 | Danielson et al. | |
| 5,563,702 A | 10/1996 | Emery et al. | |
| 5,572,598 A | 11/1996 | Wihl et al. | |
| 5,574,800 A | 11/1996 | Inoue et al. | |
| 5,586,058 A | 12/1996 | Aloni et al. | |
| 5,619,429 A | 4/1997 | Aloni et al. | |
| 5,737,072 A | 4/1998 | Emery et al. | |
| 6,052,478 A | 4/2000 | Wihl et al. | |
| 6,115,505 A * | 9/2000 | Hashima et al. | 382/286 |
| 6,137,570 A * | 10/2000 | Chuang et al. | 356/237.5 |
| 6,282,309 B1 | 8/2001 | Emery | |

FOREIGN PATENT DOCUMENTS

| | | |
|---|---|---|
| JP | 5126754 | 5/1993 |
| JP | 772089 | 3/1995 |

* cited by examiner

*Primary Examiner*—Bhavesh M. Mehta
*Assistant Examiner*—John Strege
(74) *Attorney, Agent, or Firm*—Mark M. Friedman

(57) ABSTRACT

A method for inspecting a patterned surface employs reference data related to the pattern to provide a map for identifying regions which are expected to generate equivalent images. These regions are then compared in an image-to-image comparison to identify possible defects. In a first implementation, the regions are related by local symmetry operators. In a second, disjoint corner features or other features are classified and similar features compared.

27 Claims, 8 Drawing Sheets

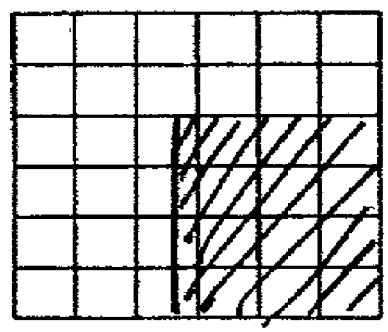
FIG. 5A
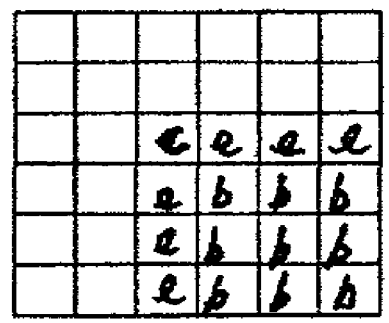
FIG. 5B
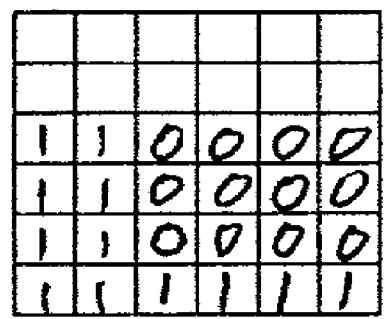
FIG. 5C

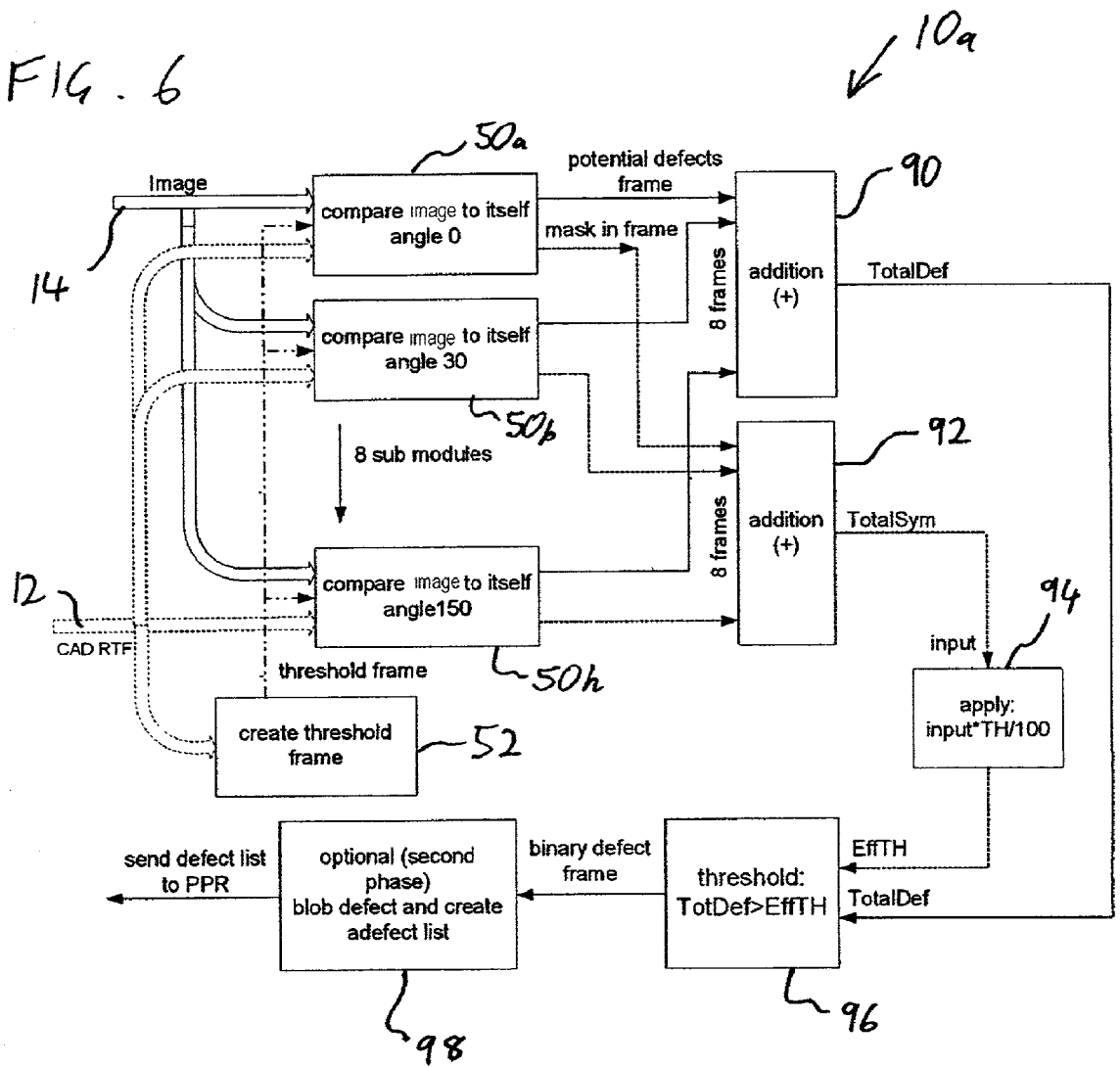

METHOD FOR PATTERN INSPECTION

FIELD AND BACKGROUND OF THE INVENTION

The present invention relates to pattern inspection and, in particular, it concerns methods for processing high resolution images to identify defects on patterned surfaces, such as reticles, photomasks, semiconductor wafers, flat panel displays and other patterned objects.

It is known to generate optical, e-beam or other types of images of various patterned surfaces for the purpose of detecting defects. Image comparison is typically used in order to identify defects. Conventional techniques may be subdivided into two general classes, referred to herein as "die-to-database" and "die-to-die" comparisons.

In die-to-database comparisons, the image is compared to reference information typically corresponding to a CAD design according to which the pattern was produced. While this approach seems intuitively straightforward, practical implementations based upon this idea encounter numerous problems. Specifically, the database information typically corresponds to an idealized binary pattern where every point is either conductor or insulator, transparent or opaque, or the like. In contrast, the acquired image is a noisy multilevel grayscale image where intended features and defects are distinguished by subtleties of shading. In order to facilitate comparison, various theoretical models may be used to generate a synthesized grayscale reference image. Such models, however, are difficult to implement, and do not always provide reliable results.

In order to avoid these problems, many inspection systems employ die-to-die comparison wherein images of equivalent regions of adjacent dice on a wafer are compared directly. This is highly effective for identifying differences between dice, but does not indicate which die is defective. For this purpose, three-neighbor comparison is typically used to identify the defective die based upon a statistically justified assumption that a random defect will not occur at the same position in two dice.

One obvious limitation of die-to-die comparison is that it is only applicable where multiple copies of an identical pattern are available for comparison. In applications such as mask inspection where a single non-repetitive pattern is to be inspected, inspection systems generally revert to database-type comparison with its serious shortcomings as mentioned above.

An additional more subtle problem with die-to-die comparison limits the sensitivity of the technique, even where it is applicable. Specifically, the distance between the patterns being compared is necessarily the inter-die spacing. Both production techniques and imaging techniques generally introduce spatially-variable noise which is sufficient over the inter-die spacing to significantly degrade the sensitivity of the die-to-die comparison. Thus, for example, in the special case of a memory chip where the internally repetitive structure permits cell-to-cell comparison, a threshold of about 6 grayscale levels (out of 256) may be sufficient to reliably avoid false defect detection whereas, for die-to-die comparison necessary for logic chips, the threshold needed to be raised to 20 grayscale levels to avoid false alarms.

There is therefore a need for a pattern inspection technique which would facilitate image-to-image comparison within a single non-repetitive pattern.

SUMMARY OF THE INVENTION

The present invention is a method for inspecting a patterned surface having a pattern which corresponds substantially to a set of reference data.

According to the teachings of the present invention there is provided, a method for inspecting a patterned surface having a pattern which corresponds substantially to a set of reference data, the method comprising: (a) generating a multilevel pixel image of at least one region of the pattern, the pattern being non-repetitive within the at least one region; (b) processing the reference data corresponding to the at least one region of the pattern to identify at least two groups of pixels which are expected to generate equivalent images; and (c) comparing the at least two groups of pixels from the multilevel pixel image.

According to a further feature of the present invention, the at least two groups are related by a coordinate displacement of pixels within a single region corresponding to translational symmetry of the pixels.

According to a further feature of the present invention, the coordinate displacement has a magnitude in the range from 1 to 10 pixels.

According to a further feature of the present invention, the coordinate displacement has a first magnitude, and wherein the steps of processing and comparing are repeated for a second coordinate displacement having a magnitude different from the first magnitude.

According to a further feature of the present invention, at least one additional inspection algorithm is applied to the multilevel pixel image.

According to a further feature of the present invention, the at least one additional inspection algorithm includes: (a) processing the reference data to identify regions of the pattern which include defined features; (b) classifying the regions by use of the reference data into sets of regions containing comparable occurrences of the defined features which are expected to be similar according to predefined criteria; (c) obtaining multilevel pixel images of a plurality of the regions which contain the comparable occurrences; and (d) comparing the multilevel pixel images for the comparable occurrences.

According to a further feature of the present invention, the generating a multilevel pixel image is performed by an imaging system having a data output rate, and wherein at least the steps of processing and comparing are performed at a rate limited by the data output rate.

According to a further feature of the present invention, the at least two groups include a first group of pixels corresponding to an edge of a feature in the pattern, the edge having an extensional direction, and a second group of pixels related to the first group of pixels by a predefined coordinate displacement parallel to the extensional direction.

According to a further feature of the present invention, the coordinate displacement has a magnitude in the range from 1 to 10 pixels.

According to a further feature of the present invention, the at least two groups include a first group of pixels corresponding to a corner of a feature in a first region of the pattern and a second group of pixels corresponding to a corner of a feature in a second region of the pattern.

According to a further feature of the present invention, the patterned surface is a mask, and wherein the reference data is a database of information corresponding to a design of the pattern.

According to a further feature of the present invention, the patterned surface is a die formed on a wafer.

According to a further feature of the present invention, the reference data is obtained by generating an image of a similar sample region.

There is also provided according to the teachings of the present invention, a method for inspecting a patterned surface having a pattern which corresponds substantially to a set of reference data, the method comprising: (a) generating a multilevel pixel image of at least one region of the pattern; (b) processing the reference data corresponding to the at least one region of the pattern to identify at least one group of pixels which is expected to be invariant under a given pixel displacement vector; and (c) comparing the at least one group of pixels from the multilevel pixel image with pixels related thereto by the pixel displacement vector.

According to a further feature of the present invention, the processing includes an erosion operation to exclude from the at least one group of pixels a subset of the pixels which are expected to be invariant under the given pixel displacement vector.

According to a further feature of the present invention, the processing is performed to identify pixels which are expected to be invariant under both addition and subtraction of the displacement vector, and wherein the comparing includes comparing each of the at least one group of pixels from the multilevel pixel image with pixels related thereto by both addition and subtraction of the displacement vector.

According to a further feature of the present invention, the steps of processing and comparing are repeated for each of a plurality of pixel displacement vectors in different directions.

According to a further feature of the present invention, the comparing selectively generates a potential defect output when grayscale levels of the pixels differ by more than a defined threshold value, the method further comprising: (a) identifying a symmetry count corresponding to a number of the displacement vectors under which a pixel is expected to be invariant; (b) generating a potential defect count corresponding to a number of potential defect outputs generated for the pixel; and (c) applying a defect determination criterion employing both the symmetry count and the potential defect count to generate a binary defect output for the pixel.

According to a further feature of the present invention, the plurality of pixel displacement vectors include displacement vectors in at least four different directions.

According to a further feature of the present invention, the plurality of pixel displacement vectors include displacement vectors in eight different directions.

According to a further feature of the present invention, the pixel displacement vector has a magnitude in the range from 1 to 10 pixels.

According to a further feature of the present invention, the steps of processing and comparing are repeated for each of a plurality of pixel displacement vectors of different magnitudes in a given direction.

According to a further feature of the present invention, the generating a multilevel pixel image is performed by an imaging system having a data output rate, and wherein at least the steps of processing and comparing are performed at a rate limited by the data output rate.

According to a further feature of the present invention, the reference data are employed to generate a threshold value for each pixel from the group of pixels, wherein the comparing is performed by comparing a magnitude of a difference between grayscale levels of the pixels with a corresponding threshold value.

According to a further feature of the present invention, the threshold value for a pixel varies as a position dependent function.

There is also provided according to the teachings of the present invention, a method for inspecting a patterned surface having a pattern which corresponds substantially to a set of reference data, the method comprising: (a) processing the reference data to identify regions of the pattern which include defined features; (b) classifying the regions by use of the reference data into sets of regions containing comparable occurrences of the defined features which are expected to be similar according to predefined criteria; (c) obtaining multilevel pixel images of a plurality of the regions which contain the comparable occurrences; and (d) comparing the multilevel pixel images for the comparable occurrences.

According to a further feature of the present invention, the comparing includes: (a) employing a measure of deviation between multilevel pixel images to derive statistical data relating to the images of comparable occurrences of the defined features; and (b) applying a significance criterion to the statistical data to identify features which differ in a statistically significant manner from the comparable occurrences of the defined features.

BRIEF DESCRIPTION OF THE DRAWINGS

The invention is herein described, by way of example only, with reference to the accompanying drawings, wherein:

FIG. 4A is a schematic representation of pattern reference data superimposed on a region of pixels;

FIG. 4B is a schematic representation of a pixel map corresponding to the reference data of FIG. 4A;

FIG. 4C is a binary map of pixels from FIG. 4B expected to be invariant under an upward displacement of one pixel;

FIG. 4D is a binary map of pixels from FIG. 4B expected to be invariant under a diagonal upward and rightward displacement of 1.41 pixels;

FIG. 4E is a binary map of pixels from FIG. 4B expected to be invariant under a leftward displacement of one pixel;

FIG. 4F is a summation of the total translational symmetry for pixels covered by the maps of all of FIGS. 4C–4E;

FIG. 5A is a schematic representation of pattern reference data corresponding to a corner feature superimposed on a region of pixels;

FIG. 5B is a schematic representation of a pixel map corresponding to the reference data of FIG. 5A;

FIG. 5C is a binary map of pixels from FIG. 5B expected to be invariant under an upward displacement of two pixels;

FIG. 6 is a flow diagram showing a preferred implementation of a self-comparison test module suited for use in the system of FIG. 2;

DESCRIPTION OF THE PREFERRED EMBODIMENTS

The present invention is a method for inspecting a patterned surface.

The principles and operation of methods according to the present invention may be better understood with reference to the drawings and the accompanying description.

Figure 1:
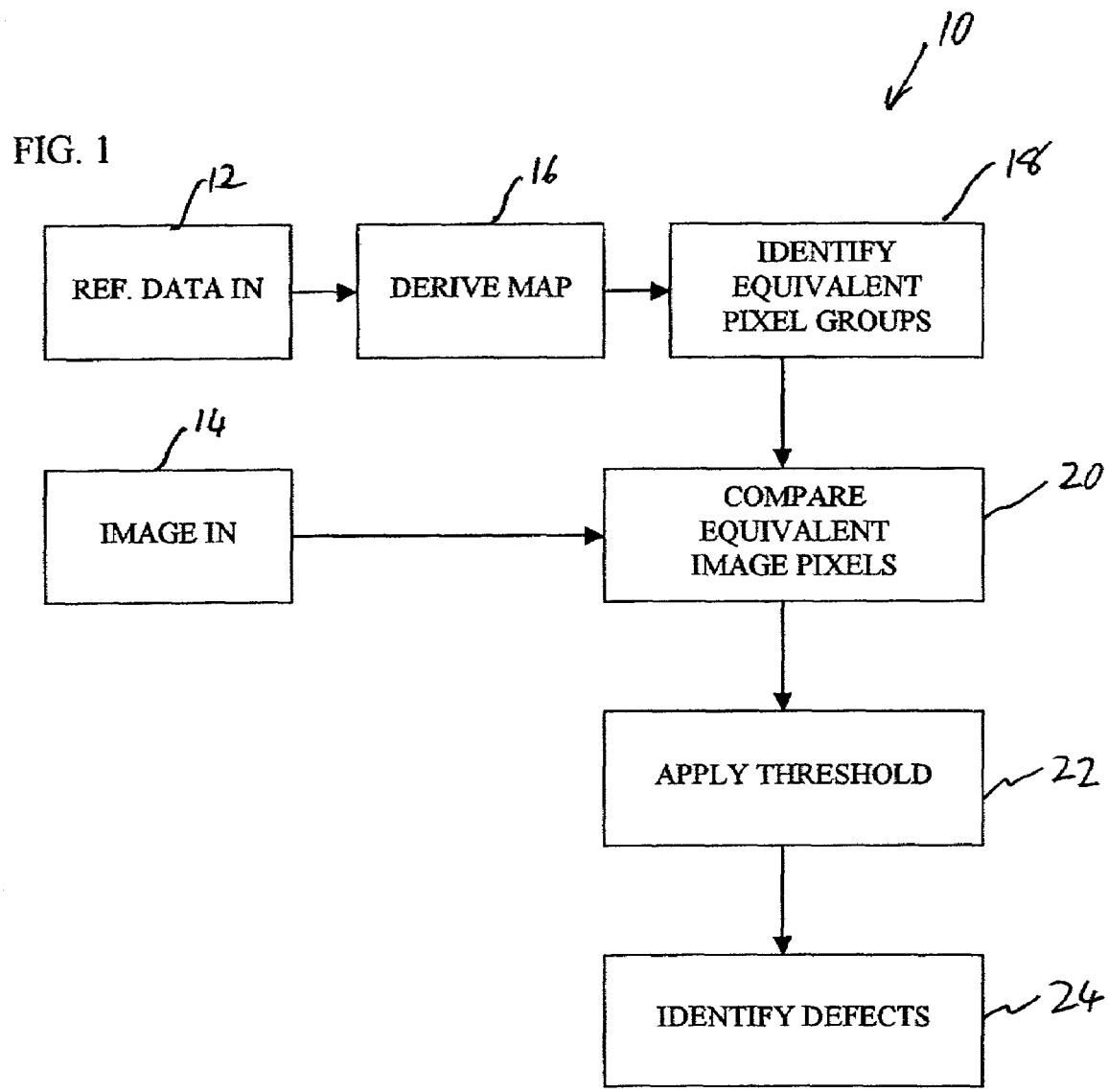
FIG. 1 is a flow diagram illustrating the general principles of a method for inspecting a patterned surface, constructed and operative according to the teachings of the present invention.

Referring now to the drawings, FIG. 1 illustrates the basic concept which underlies a number of different aspects of the present invention which will be described in detail below. Thus, in its basic concept, the present invention provides a method, generally designated 10, for inspecting a patterned surface having a pattern which corresponds substantially to a set of reference data. In general terms, method 10 employs inputs of the reference data 12 and a multilevel pixel image of at least one non-repetitive region of the pattern 14. The reference data corresponding to the at least one region of the pattern is used directly, or after processing (step 16), as a map which is processed to identify at least two groups of pixels which are expected to generate equivalent images (step 18). These at least two groups of pixels from the multilevel pixel image are then compared (step 20) and a threshold applied (step 22) to identify suspected defects (step 24).

It will be immediately apparent that the principles of the present invention provide a highly advantageous approach to comparison inspection of patterns. Firstly, by using the reference data as a map, it is possible to perform image-to-image comparisons in situations where conventional die-to-die or cell-to-cell approaches are inapplicable, such as for example a single mask for production of logic chips. Furthermore, even in cases where die-to-die comparison is possible, the present invention typically facilitates pixel-to-pixel or region-to-region comparison at much smaller spacing than the inter-die spacing used for die-to-die comparisons. Finally, the reference data is here used only as a map of comparable pixel groups, while all comparisons are performed between pixels of the real image. This avoids all the complications of image-to-database comparisons mentioned earlier. These and other advantages of the present invention will become clearer from the following description.

As already mentioned, the method of the present invention is applicable to a wide range of inspection application including, but not limited to, inspection of masks, dice on wafers, PCBs, printed patterns, mechanical parts and other patterned surfaces. In the case of a single mask, the reference data is typically CAD design information according to which the pattern was generated. In the case of dice on a wafer, the reference data may be either design information or a sample image of a die taken from the same or another wafer. Although spatially dependent production and imaging variations would render a sample die image from another part of the wafer unsuitable for direct comparison, it is sufficient for use as a "map" in the sense required by the present invention.

It will be noted that the at least one region within which comparisons are performed is described here as "non-repetitive" to distinguish from repetitive patterns such as memory chips where cell-to-cell comparison can be performed by conventional techniques. It should be noted, however, that the term "non-repetitive" is used herein to refer to any pattern which is not completely repetitive, and includes cases of patterns which include locally repetitive patterns within an overall non-repetitive pattern (for example, mixed memory and logic chips). In such cases, the invention can be used to implement inspection similar to conventional cell-to-cell comparison while avoiding false defect indications in the non-repetitive areas. Clearly, a system operating according to the teachings of the present invention will also operate efficiently if employed to inspect a fully repetitive pattern.

It should also be noted that the term "non-repetitive" is used herein to refer to a pattern which is non-repetitive over the regions within which the comparisons are performed by the algorithms. In cases such as die inspection, the pattern may actually be repetitive on a larger scale (e.g., whole dice), but is considered non-repetitive for application of the present invention for intra-die comparison and defect detection.

Figure 2:
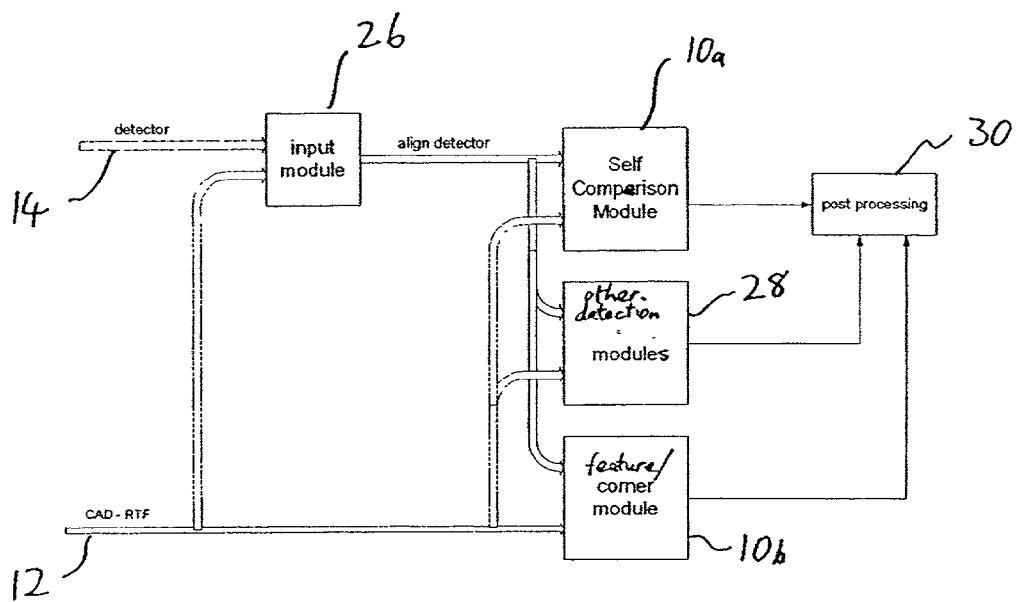
FIG. 2 is an overall block diagram illustrating the overall operation of a preferred multi-test-module system, constructed and operative according to the teachings of the present invention, for inspecting a patterned surface.

Referring now to FIG. 2, without in any way detracting from the general applicability of the method of FIG. 1, the method will be exemplified herein with reference to two specific preferred implementations which are advantageously used together, and optionally with the addition of one or more supplementary test modules, to provide a highly effective inspection system and corresponding method. Thus, after initial adjustment of the alignment between the reference information and the multilevel image (step 26), the system of FIG. 2 includes a first implementation of method 10 referred to here as "self comparison module" 10a, and a second implementation of method 10 referred to here as "corner/feature module" 10b. These two test modules are preferably supplemented by one or more supplementary test modules 28. These test modules provide outputs which are co-processed at a post processing stage 30 to provide highly effective and reliable pattern defect detection, as will become clear below. The various components of this system will now be described in more detail.

Preprocessing Steps

Turning first to the data inputs, it should be noted that the system and method of the present invention is intended primarily for implementation as a high speed automated inspection system. The technical requirements for such systems are constantly changing with the advance of production techniques. By way of example, the maximum pixel resolution for inspection of a mask is currently 20 nm per pixel. For a 40 mm square mask, this corresponds to a total of $4 \times 10^{12}$ pixels per mask. To maximize efficiency, the inspection system is required to process the input image data in real time at the output rate of the imaging system, for example, at about 300 MB per second of image data.

To facilitate such high speed processing, the reference data is preferably preprocessed to convert it into a data format which parallels the intended scanning path of the imaging system across the patterned surface. Such a format may be referred to as a "real time format" (RTF) in the sense that the data sequence parallels the data sequence of image data from the imaging system. In the preferred example of CAD design reference information, this format, referred to here as a "rasterized format", preferably contains binary information as to the intended content of each pixel (transparent/opaque or dark/light). The rasterized format is streamed to the system in a sequence corresponding to the scanning path of the imaging system, thereby facilitating efficient processing of reference data corresponding to the image region currently being processed. Both data streams are preferably subdivided into frames for processing purposes, as is known in the art. For various implementations, these frames constitute the "map" used by the algorithms of the present invention. For certain implementations of the present invention, the "map" may be implemented in other ways such as, for example, a list of polygons (types, positions and orientations).

Figure 3:
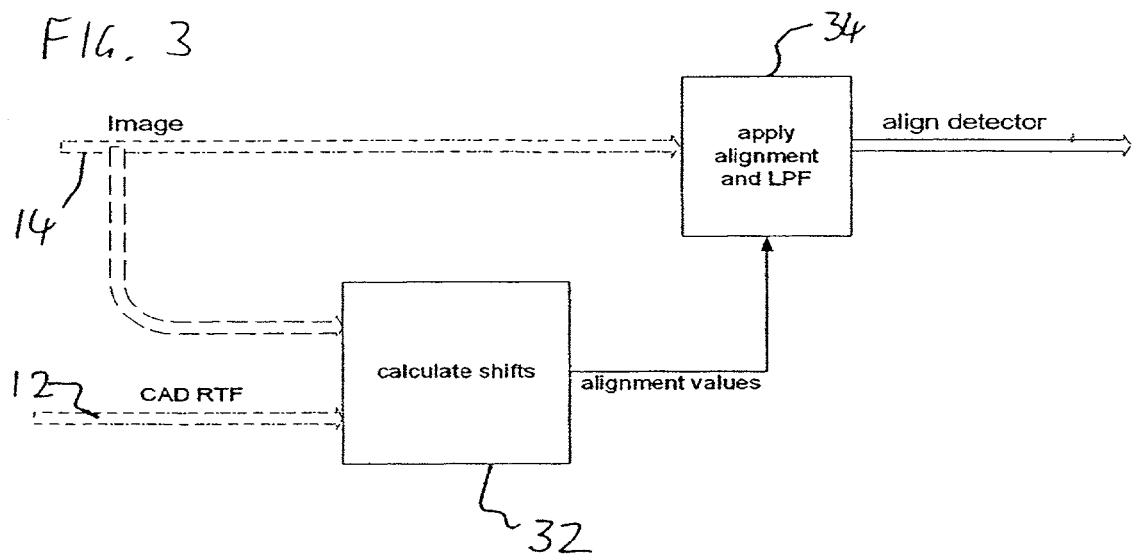
FIG. 3 is an expanded schematic flow diagram illustrating an input module from the system of FIG. 2.

Referring now to FIG. 3, the present invention requires pixel-by-pixel association of an aquired pixel image with reference data corresponding to the same region of the pattern. This alignment requirement is common in prior art systems which perform die-to-database comparison and may be achieved by various known techniques. Accordingly, alignment adjustment procedure 26 will not be discussed here in detail.

By way of a non limiting example, FIG. 3 shows an implementation of of alignment adjustment procedure 26 in which the image input and reference data are supplied to a shift calculator 32. Shift calculator 32 selects relatively small frames within corresponding data chunks from the image input and corresponding rasterized data and processes them to derive an alignment correction. The processing may be performed by pixel shift correlation to obtain an integer pixel shift correction, and/or may employ algorithms for sub-pixel alignment correction. These techniques are know per se, and will not be dealt with here. The size of the pixel shift range over which the correlation needs to be checked depends upon the tolerances of the scanning system.

It should be noted that the processing rate of shift calculator 32 is generally not a limiting factor in the overall processing rate since the shift calculation is performed using a small subset of the scanned data, the shift being assumed to be uniform over the current scanning area.

The output from shift calculator 32 is then provided to alignment corrector 34. Alignment corrector 34 shifts the data by the alignment correction vector, thereby ensuring proper alignment between the grayscale image pixels and the corresponding reference data. Optionally, depending upon the noise level present in the data, alignment corrector 34 may also include a low pass filter. Depending upon the implementation of shift calculator 32, this correction may be a shift of an integer number of pixels, or a sub-pixel resolution shift. The alignment correction is shown here applied to the image data 14, but a correction could alternatively be applied to the reference data instead, either in its rasterized form or prior thereto. The reference data and image data are then ready for input to the various test modules described below.

Self-Comparison Test Module

Self-comparison test module 10a is a special case of the method 10 wherein the groups of pixels to be compared are related by a coordinate displacement of pixels which is typically small compared to the pattern features. In other words, the reference data is used to identify which pixels are expected to exhibit translational symmetry and then to test this symmetry by comparing pixels related by a corresponding displacement vector. The principles of this module will be illustrated schematically with reference to FIGS. 4A–4F.

Figures 4A, 4B, 4C, 4D, 4E, 4F:
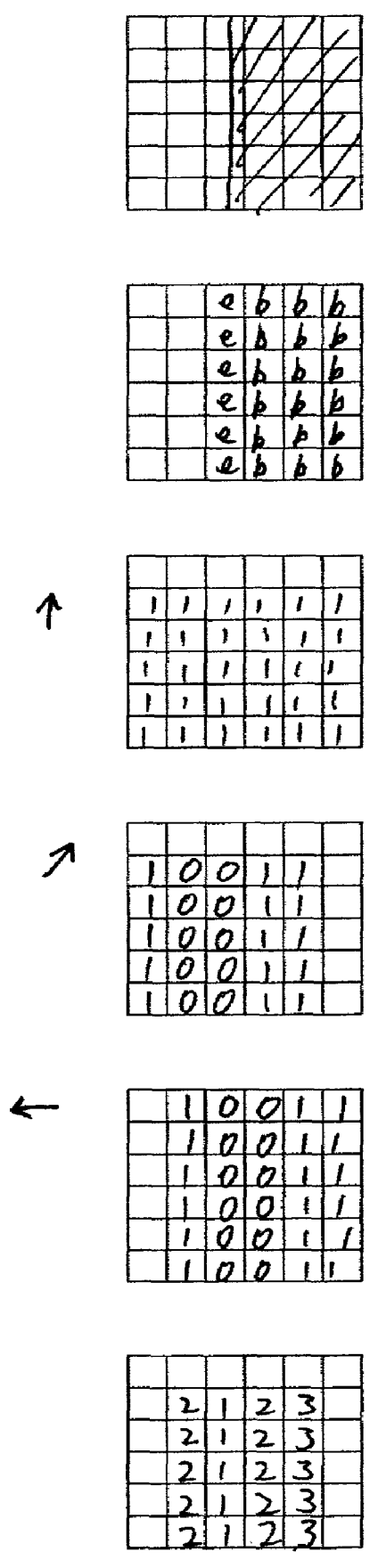

Referring first to FIG. 4A, this represents schematically a portion of the pattern reference data superimposed on a region of pixels. In this case, the part of the pattern shown corresponds to an edge of a pattern block with the edge passing up-down through the middle of a column of pixels. Parenthetically, it will be noted that reference data based upon CAD design information typically has resolution much higher than that of the pixel grid.

FIG. 4B shows a pixel map corresponding to the reference data of FIG. 4A. Here, bulk pixels within the boundaries of the pattern feature are designated "b" whereas pixels through which the edge passes are designated "e".

FIG. 4C is a binary map which shows which pixels from FIG. 4B are expected to be invariant under an upward displacement of one pixel. Since the edge within this frame is up-down, the entire frame is symmetrical under an upward displacement such that all pixels are invariant. This allows comparison of the image in this region to itself under translation. Any significant variation between the image and its translated self provides an indication of a likely defect.

FIG. 4D is a corresponding map of pixels from FIG. 4B expected to be invariant under a diagonal upward and rightward displacement. In this case, for simplicity of representation, the displacement is chosen to be between diagonally adjacent pixels, corresponding to a displacement of magnitude 1.41 pixels. In this case, since the displacement vector is not parallel to the edge, the region of the edge is not symmetrical under this translation. The bulk region away from the edge, however, is also expected to be under this translation. Similarly, in FIG. 4E is shown a corresponding map for a leftward displacement of one pixel.

FIG. 4F shows the sums of the values from FIGS. 4C–4E (for the region common to all maps). The bulk regions away from the edge can be examined by self-comparison under a plurality of pixel displacement vectors in different directions. The edge regions themselves, on the other hand, are invariant only under translation parallel to the edge, allowing only a single self-comparison.

In practice, the self-comparison is preferably performed for each angle present in the pattern. According to accepted conventions, the only edge angles used are 0°, 30°, 45°, 60°, 90°, 120°, 135° and 150°. So long as the set of displacement vectors includes a vector parallel to each edge, the technique will be effective for inspecting edge regions of the pattern, in addition to the bulk regions.

Parenthetically, it should be noted that the angles referred to herein as 30°, 60°, 120° and 150° are actually defined by arctangent of ½, and are more accurately stated as multiples of 90°±26.565°. This approximation is used herein for convenience of terminology.

One limitation of the self-comparison technique relates to inspection of corner features, as illustrated in FIGS. 5A–5C. FIG. 5A illustrates a reference data pattern, FIG. 5B a corresponding map, and FIG. 5C a binary map of pixel invariance under a two-cell upward translation. In this case, the region of the pattern in question includes a corner feature. It will be appreciated that the region of the corner has reduced symmetry so that it is not invariant under bi-directional translation parallel to either of the edges which meet at the corner. Optionally, the corner region which cannot be checked by the bi-directional self-comparison implementation may be reduced in size by using uni-directional displacement vectors directed towards the bulk regions inside and outside the corner. In order to fully address the issue of testing corner regions, the self-comparison test module is preferably supplemented by at least one additional test module for inspecting corner features and/or other features, as detailed below.

Turning now to FIG. 6, this illustrates a preferred structure for implementing self-comparison test module 10a. This module takes the aligned reference data and image frames as inputs and generates initially a binary defect frame. Optionally, this output frame can be further processed to generate a list of defects with additional information such as: X location, Y location, X length, Y length, defect size etc. to define blocks containing the defects.

Self-comparison test module 10a as shown here includes eight comparison sub-modules 50a, 50b, 50h which compare pixel groups to themselves under positive and negative pixel displacements at angles 0°, 30°, 45°, 60°, 90°, 120°, 135° and 150°, respectively. The comparison may be performed by comparison of grayscale values, gradients or any other comparison function or combination of comparison functions operating on individual pixels or groups of pixels. In a particularly preferred simple and effective implementation, the comparison is performed by comparing a magnitude of a difference between grayscale levels of the pixels against a corresponding threshold value. Although a constant threshold value could be used for all pixels, it is believed preferable to use a position-dependent threshold corresponding to varying noise levels typically encountered in different regions of the pattern, due either to design or imaging considerations. Thus, in the preferred example illustrated here, each comparison sub-module receives an additional input from a threshold frame generator 52 which employs reference data 12 to generate a threshold value for use in the comparison of each pixel. By way of example, the threshold value for a pixel may vary primarily, or exclusively, as a function of proximity to an edge in the pattern. For "bulk" pixels far from an edge, a relatively low threshold (i.e., high sensitivity) is used for detecting defects. In regions near an edge, where there is typically much more significant noise in the image signal, a higher (i.e., less sensitive) threshold value is set. Optionally, the threshold for each pixel may be set separately for each comparison angle. In many cases, however, a single threshold value for each pixel, defined only by proximity to an edge, is believed to be sufficient.

Figure 7:
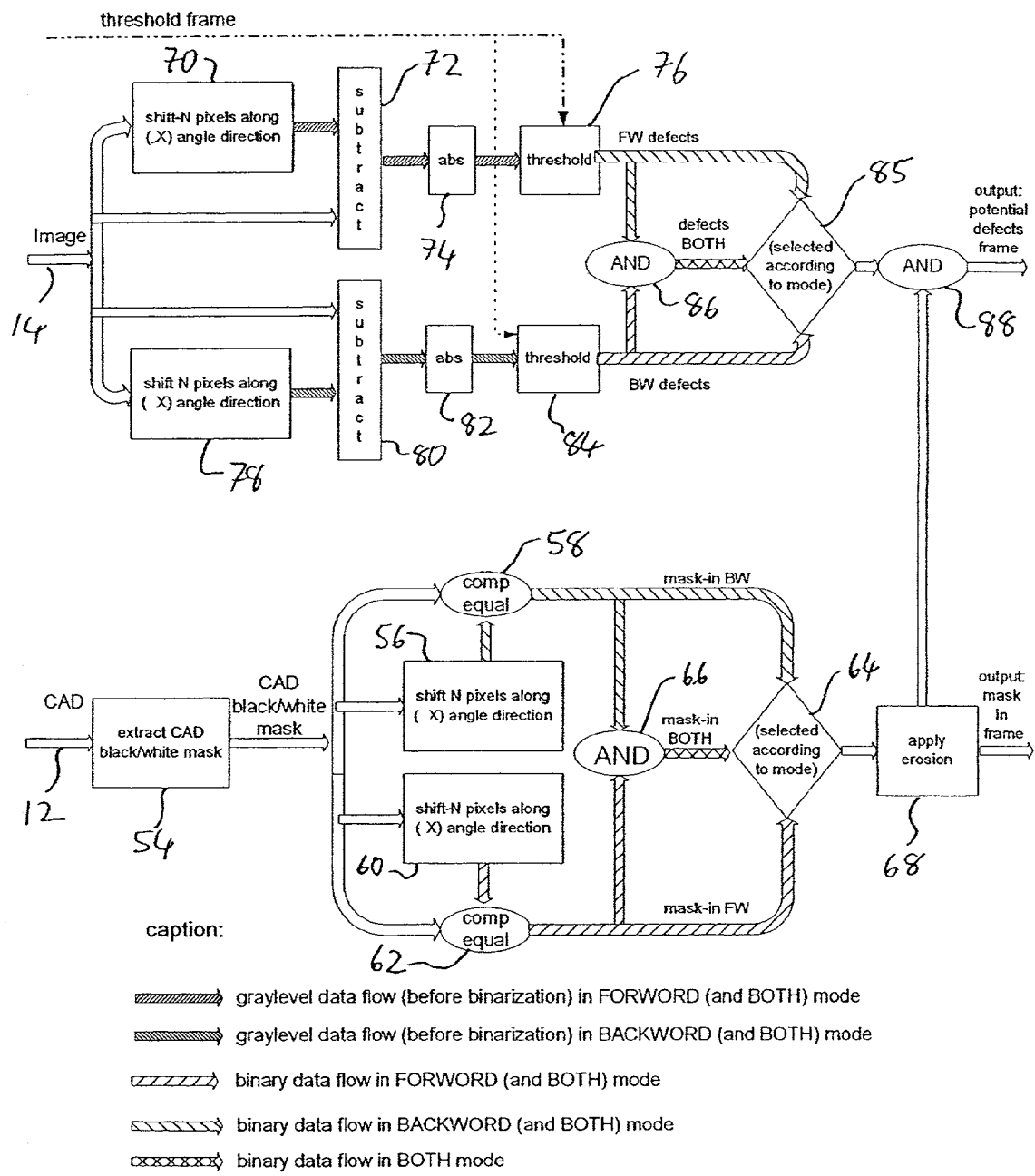
FIG. 7 is a detailed flow diagram of one possible implementation of a single-angle displacement self-comparison sub-module from the test module of FIG. 6.

One possible implementation of comparison sub-modules 50a, 50b, . . . , 50h is shown in FIG. 7. The comparison sub-modules are all similar, differing only in the angle of the pixel displacement vector used in the comparison. The module will therefore be described here generically as sub-module 50x with reference to a displacement vector direction X.

Turning first to the lower part of FIG. 7, this describes the identification of pixels expected to be invariant under the given pixel displacement vector. The binary map is first extracted from the current frame of rasterized reference data at 54. Then, at 56, the binary map is shifted along the X direction by an amount of N pixels (or an approximation thereto for non-orthogonal angles). The selection of the value N depends upon the resolution of the pixels relative to the features of the pattern. If the value is set too small, image pixels compared may be similarly defective and may fail to be detected. If the value is set too high, the exception regions around corner features become unnecessarily large. In many cases, a shift of magnitude in the range from 1 to 10 pixels, and most preferably in the range from 3 to 6 pixels, is advantageous. It is also often advantageous to repeat the comparison with shifts of two or more different magnitudes: a smaller shift is effective to check relatively close to corners, while a larger magnitude detects longer range defects such as bulges or recesses which extend along an edge and which may not be detected using a small shift. Where different magnitude shifts are used, they preferably differ by at least one pixel edge length. At 58, the shifted binary map is compared to the original binary map using a "compare equal" operation. The resulting frame is called the "backward shift mask-in frame" in which a "1" indicates a pixel which is expected to be invariant under a translation of −N pixels in angle direction X.

In a preferred implementation where comparison is performed bi-directionally, i.e., by both addition and subtraction of the pixel displacement vector, the binary map output generated at 54 is also shifted by −N along the X direction (step 60) and the original and shifted binary maps are compared by a "compare equal" operation 62. The new resultant frame, called the "forward shift mask-in frame", has a "1" to indicate each pixel which is expected to be invariant under addition of a vector of N pixels in direction X.

As will be discussed below, the comparison sub-modules described here may be implemented to operate in one or more of a number of different modes, corresponding to invariance of a pixel under a forward shift, a backward shift, either direction or both directions. One or more mask-in output frame is selected at 64 according to the intended mode of use from: the backward shift mask-in frame, the forward shift mask-in frame, and a logical combination thereof such as the AND operation illustrated at 66.

Preferably, an erosion operation 68 is then performed on the mask-in frame to reduce the size of regions designated to be invariant. The erosion operation is intended to enlarge the mask out areas to avoid problematic features (e.g., adjacent to corners and to narrow lines) which could otherwise generate false alarms. This step can be performed using a standard erosion operator, or may optionally be implemented to selectively erode selected types of regions which are covered by the other test modules. The resultant mask-in frame is the output from the mask-generating sub-module.

Turning now to the upper part of FIG. 7, this describes the comparison of the grayscale image pixels. Firstly, the input image frame 14 is shifted by −N pixels along the X direction at 70. The original frame is then subtracted from the shifted frame (step 72) and the absolute value is taken of the result (step 74). The resulting difference frame of comparison values is then compared with a threshold frame (provided by threshold generator 52) at step 76 to generate a binary frame called the "forward shift defect frame". This forward shift defect frame is a binary map of all pixels which differ significantly from the pixel related by addition of the displacement vector, the "significance" level being defined by the corresponding threshold value.

Similarly, in the preferred case of bi-directional comparison, the input image frame is shifted N pixels along the X direction at 78 and the original frame is then subtracted from the shifted frame (step 80). Here too, the absolute value is taken (step 82) and the resulting difference frame is compared with the threshold frame from threshold generator 52 at step 84 to generate a binary frame called the "backward shift defect frame". This backward shift defect frame is a binary map of all pixels which differ significantly from the pixel related by subtraction of the displacement vector.

As mentioned before, the comparison sub-modules described here may be implemented to operate in one or more of a number of different modes. One or more defect output frame is selected at 85 according to the intended mode of use from: the forward defect frame, the backward defect frame, and a logical combination thereof such as the AND operation illustrated at 86. This latter option is indicative of pixels which differ significantly from pixels related by both addition and subtraction of the displacement vector. In an alternative implementation, AND operation 86 is replaced by an OR operation with a resulting increase in "sensitivity" which would need to be offset by adjustment of the threshold values.

The selected "mask-in frame" and the "defect frame" are then combined by an AND operation 88 to generate a "potential defect frame" in which a "1" indicates a potential defect. This "potential defect frame" is the second output of this sub-module.

As mentioned, the comparison sub-modules may be implemented to operate in one or more of a number of different modes, corresponding to invariance of a pixel under a forward shift, a backward shift, either direction or both directions. For a one-directional shift, the output frame is calculated at 88 by the AND operation between the forward defect frame and the forward mask-in frame, or between the backward defect frame and the backward mask-in frame. Where both directions are to be used, the comparison may be implemented in an "either" mode which generates a "1" where either direction indicates a possible defect, or a "both" mode which only generates a "1" where both forward and backward shift comparisons indicate a possible defect. The "both" mode is preferably implemented by employing AND operation 88 between the outputs of AND operation 66 and the AND operation 86. The "either" mode is typically implemented as an OR combination of the one-directional forward and backward output defect frames, i.e., after they have been combined individually by an AND operator with their respective mask-in frames. Optionally, in one particularly preferred implementation, both the "either" and "both" may be implemented in parallel with different thresholds (since the "either" mode is much more sensitive than the "both" mode). According to yet a further preferred option, two, three or even all of the above modes may be implemented in parallel for one or more magnitude of displacement N and their results combined with appropriate weighting or other combination algorithms in a manner known in the art to offer improved reliability and sensitivity of the module output.

As mentioned before, sub-module 50x is similar for each direction X. In each case, the required displacement vector is made up from combinations of whole pixel displacements. Specifically, the required angles fall into three groups: axis-parallel shifts of 0° and 90°; diagonal shifts of 45° and 135°; and multiples of 90°±26.565° (referred to herein as 30°, 60°, 120° and 150°). In the case of axis-parallel shifts, the shift is implemented simply in units of 1 or more whole pixels. In the case of diagonal shifts, the basic unit is a combination of a single pixel shift in both the X and the Y axes with a magnitude of the square root of 2 or 1.41 pixels. Multiples of 30° are achieved by shifts of one pixel along one axis and two pixels along the other direction. The magnitude of the basic shift is therefore equal to the square root of 5, or about 2.23 pixels.

By using appropriate multiples of these basic steps, it is possible to approximate to a given desired shift magnitude in all directions. For example, for a shift distance of 4 pixels, 3 steps are used in the 45 degree directions (a step of about 4.2 pixels) and 2 steps are used in the 30 degree directions (a step of about 4.46 pixels). It should be noted, however, that it is also possible to employ different shift distances for the different directions if the resulting variations in edge behavior are properly addressed.

Returning now to FIG. 6, in the example described herein, each of the comparison modules outputs a binary frame in which "1" stand for a potential defect. Various techniques are known in the art for combining results of different detection modules, and any such technique can be used here. By way of one preferred example, these eight outputs are here added at 90 to get a frame (referred to as the "defect number frame") in which each pixel can have a value between 0 to 8 ("TotalDef"). This value represent the number of sub-modules that report a defect in the pixel. The eight comparison sub-modules also output their "mask-in" frames. These "mask-in" frames are added together at 92 to get a frame (referred to as the "symmetry class frame") in which each pixel can have a value between 0 to 8 ("TotalSym") representing the number of transformations under which the pixel is expected to be invariant. The value of a pixel in this frame represents the maximal number of sub-modules that can report a defect for that pixel. The reason is that for a given pixel a defect can be reported from a given sub-module only if it is "mask-in" in this module. Therefore adding the "mask-in" frames gives the maximal number of sub modules that can report on a defect.

A pixel is identified as part of a defect if its value in the defect number frame is more than a defined proportion of its value in the symmetry class frame. This signifies that the pixel was reported as a defect from more than a certain proportion of the sub-modules which could potentially have recognized a defect in this pixel. In this way, for very symmetric pixels (e.g., a bulk pixel that has TotalSym=8), a high threshold is applied to TotalDef (dictated by the TH value) thereby requiring multiple sub-modules to indicate a defect. For a pixel with less symmetry, a lower threshold is applied.

This evaluation is represented here by multiplying (at 94) the total symmetry value TotalSym by TH/100, where TH is a threshold (percentage) which is given by the user. It will be noted that, in the special case where TH is set to 100, the module will only report defects which are detected by all sub-modules capable of checking the pixel in question. The resulting effective threshold "EffTH" is then compared at 96 to the value in the defect number frame to generate a binary defect frame which is typically output to post-processing module 30. Algebraically, the condition for identifying a defect may be represented by the formula:

$$\text{TotalDef} \geq \text{EffTH defined by EffTH} = \text{ceil}\{\text{TH}/100 * \text{TotalSym}\}$$

where TH>0 and "ceil" is the operation of rounding up to the nearest integer. Optionally, an additional step 98 may be performed to blob together pixels having a positive binary defect output which satisfy a proximity condition to identify a defect region.

Corner/Feature Test Module

As illustrated above, the self-comparison module is effective for inspecting bulk regions and edges of a pattern, but is non-optimal for inspecting corner regions and other small features. For this reason, the self-inspection module is preferably used in combination with a corner/feature testing module 10b, as will now be described. It should be appreciated that corner/feature testing module 10b as described here is also advantageous for use in a range of other systems and is not limited to combination with the other parts of the system described here.

Here too, the method is based upon the same underlying principle of the present invention, namely, to use the reference data as a map for identifying pixels or regions of pixels which are expected to be similar, and then performing the actual comparison as an image-to-image comparison within the acquired image data. In this case, however, the regions for comparison are similar defined features (e.g., corner, contacts, ends of thin conductors, etc.) selected from different regions of the pattern.

By way of introduction, it should be understood that there are very complex issues involved in trying to define how a corner feature and other features should "look". Many different factors to do with the feature size surrounding pattern features, and production conditions, affect the final shape of a feature (e.g. how much it is rounded). This makes die-to-database inspection particularly unreliable for corners and other small features. The corner/feature inspection aspect of the present invention avoids all assumptions about how various features should look, replacing them with the simple assumption that all features of the same type should look similar.

Figure 8:
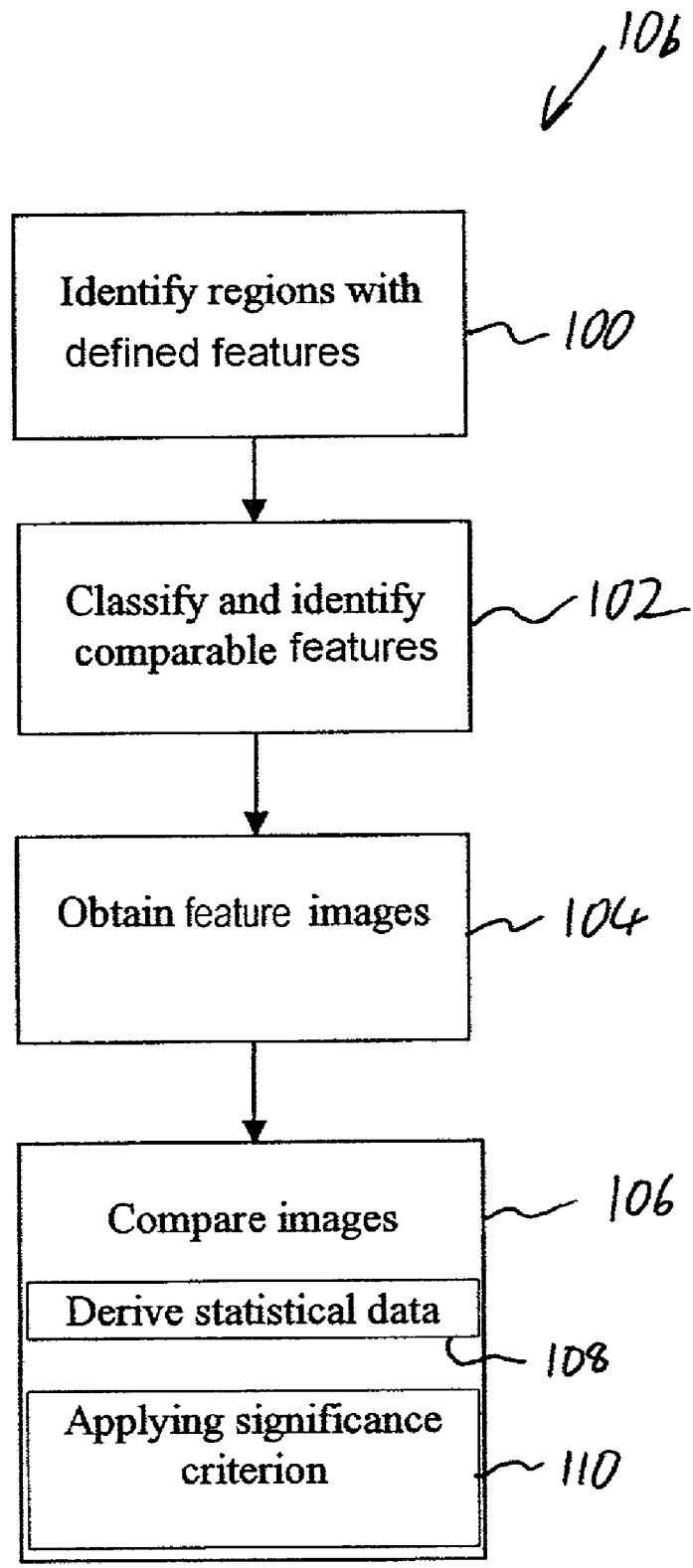
FIG. 8 is a flow diagram illustrating the operation of a corner/feature comparison test module-suited for use in the system of FIG. 2.

Turning now to FIG. 8, method 10b starts at 100 by processing the reference data 12 to identify regions of the pattern which include defined features of the types to be compared. Then, at 102, these regions are classified by use of the reference data into sets of regions containing comparable features which are expected to be similar according to predefined criteria. The image data 14 is then retrieved at 104 to obtain a multilevel pixel image of a plurality of the regions which contain the comparable features, and these regions are compared at 106 to identify likely defects in the features.

In cases where the noise level in the data is low, defects may be detected on the basis of comparisons between two, or preferably three, comparable features. For data with more significant noise, a measure of deviation between multilevel pixel images is used at 108 to derive statistical data relating to the images of comparable features. This data is then processed at 110 by applying a significance criterion to the statistical data to identify features which differ in a statistically significant manner from the other comparable features.

By way of a simplified schematic example, there follows a table of rectangles in a pattern defined by coordinates at their opposite corners (all sizes in microns).

| Rectangle Index | Upper left corner X coordinate | Upper left corner Y coordinate | Down right corner X coordinate | Down right corner Y coordinate |
|---|---|---|---|---|
| 1 | 10 | 10 | 103 | 103 |
| 2 | 118 | 15 | 190 | 90 |
| 3 | 213 | 10 | 294 | 90 |
| 4 | 313 | 12 | 381 | 97 |
| 5 | 413 | 12 | 484 | 92 |
| 6 | 510 | 10 | 591 | 92 |
| 7 | 608 | 10 | 694 | 92 |
| 8 | 703 | 10 | 784 | 95 |
| 9 | 808 | 10 | 874 | 90 |
| 10 | 914 | 1015 | 988 | 1093 |
| 11 | 10 | 1010 | 100 | 1102 |
| 12 | 118 | 1015 | 194 | 1096 |
| 13 | 213 | 1010 | 294 | 1098 |
| 14 | 313 | 1013 | 383 | 1097 |
| 15 | 413 | 1012 | 484 | 1095 |
| 16 | 510 | 1010 | 599 | 1092 |
| 17 | 608 | 1017 | 694 | 1099 |
| 18 | 703 | 1010 | 788 | 1099 |
| 19 | 808 | 1017 | 875 | 1091 |
| 20 | 914 | 1015 | 988 | 1098 |

Since the rectangles are not of the same size, direct comparison of the rectangles is not possible. Instead, just parts of the rectangles which are expected to appear the same are compared. The comparison process can be performed by any suitable comparison function, for example by either direct gray level comparison between pairs of features, or by using an analysis function applied to each region which returns a characteristic number or vector which can be used in statistical analysis of the feature. In each case, the comparison is performed so as to compare a region or "environment" of predetermined size containing the feature.

In the case of a direct gray-level comparison, various comparison functions can be used. Preferred examples include, but are not limited to, a sum of gray-level differences, a sum of absolute differences, a sum of square difference, wherein the sums may be calculated uniformly or with different weights for each pair of pixels. A further preferred example is the maximum value of the absolute difference.

In the case of an analysis function, the function may be any set of operations on a set of pixels which returns suitable number or vector of numbers. Preferred examples include, but are not limited to, the sum of the pixels, the gray level differences relative to a reference set, the gray level range, average, variance etc. Depending upon the choice of function, the value may be rotation/mirror sensitive, or may be symmetrical.

One significant factor in the classification of corner features is the resolution of the inspection performed. For the above example, if the resolution is at a level of 1 pixel per micron, all edges and corners are set in the same place also in sub-pixel resolution. This allows direct comparison of all similarly oriented corners. If, on the other hand, the resolution is 1 pixel per 2 microns, not all edges or corner are expected to be comparable, if the comparison function is sensitive in sub-pixel level.

Figure 9:
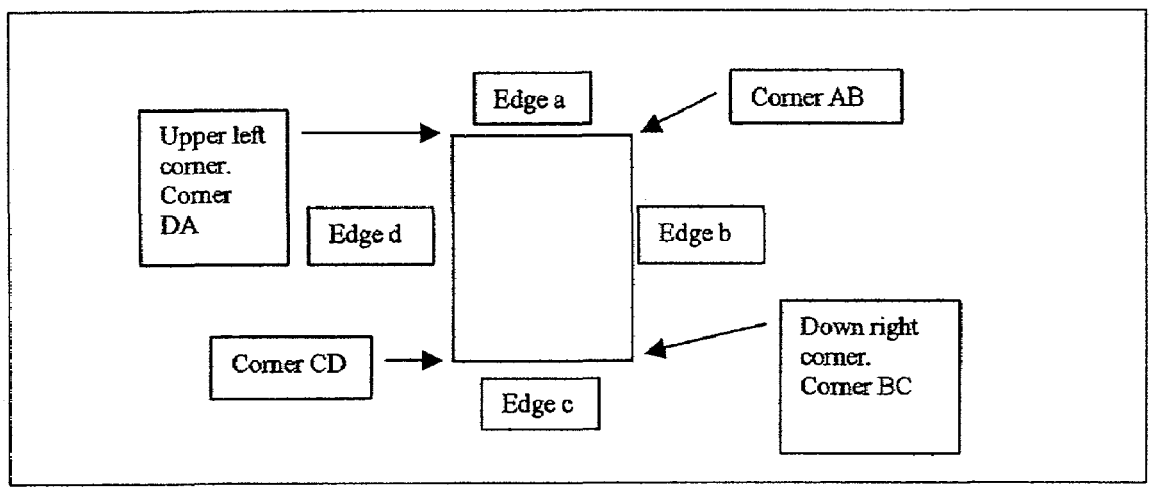
FIG. 9 is a schematic illustration of terminology used to describe a corner classification system for use in the corner/feature comparison test module of FIG. 8.

In the example of 1 pixel for 2 microns, the grouping of top-left corners ("DA" according to the labeling conventions of FIG. 9) would be:
   Rectangles 1, 6, 7, 9, 11, 16
   Rectangles 2, 10, 12, 17, 19, 20
   Rectangles 3, 4, 5, 8, 13, 15, 18
   Rectangles 14—lacks equivalents and therefore cannot be analyzed by this technique It should be noted that the "corner/feature comparison" algorithm may be used to advantage also for edge comparison to supplement the self-comparison algorithm. Specifically, the self-comparison algorithm is generally insensitive to edge displacement or very gradual drift. Defects of these types may therefore be detected by considering the edges as the "defined features" to be compared in this algorithm. Returning to the above example, the grouping for comparison of edges is simpler. For example, for edge "d" grouping would be as follows:
   Rectangles 1, 2, 6, 7, 9, 10, 11, 12, 16, 17, 19, 20
   Rectangles 3, 4, 5, 8, 13, 14, 15, 18

Supplementary Test Modules

Optionally, the aforementioned modules may be supplemented by one or more additional test modules, based upon various known algorithms, for the purpose of covering areas of insensitivity in the aforementioned modules and/or to increase overall sensitivity. Suitable algorithms, as well as logic for combining the outputs of the various different modules, are well known in the art.

It will be appreciated that the above descriptions are intended only to serve as examples, and that many other embodiments are possible within the spirit and the scope of the present invention.

What is claimed is:

1. A method for inspecting a patterned surface having a pattern which corresponds substantially to a set of reference data, the method comprising:
   (a) generating a multilevel pixel image of at least one region of the pattern, the pattern being non-repetitive within said at least one region;

(b) processing the reference data corresponding to the at least one region of the pattern to identify at least two groups of pixels within said multilevel pixel image, which are expected to be similar images to each other; and (c) comparing the at least two groups of pixels from the multilevel pixel image.

2. The method of claim 1, wherein said at least two groups are related by a coordinate displacement of pixels within a single region corresponding to translational symmetry of said pixels.

3. The method of claim 2, wherein said coordinate displacement has a magnitude in the range from 1 to 10 pixels.

4. The method of claim 2, wherein said coordinate displacement has a first magnitude, and wherein said steps of processing and comparing are repeated for a second coordinate displacement having a magnitude different from said first magnitude.

5. The method of claim 2, further comprising applying at least one additional inspection algorithm to said multilevel pixel image.

6. The method of claim 5, wherein said at least one additional inspection algorithm includes:

(a) processing the reference data to identify regions of the pattern which include defined features;

(b) classifying said regions by use of the reference data into sets of regions containing comparable occurrences of said defined features which are expected to be similar according to predefined criteria;

(c) obtaining multilevel pixel images of a plurality of said regions which contain said comparable occurrences; and (d) comparing said multilevel pixel images for said comparable occurrences.

7. The method of claim 1, wherein said generating a multilevel pixel image is performed by an imaging system having a data output rate, and wherein at least said steps of processing and comparing are performed at a rate limited by said data output rate.

8. The method of claim 1, wherein said at least two groups include a first group of pixels corresponding to an edge of a feature in the pattern, the edge having an extensional direction, and a second group of pixels related to said first group of pixels by a predefined coordinate displacement parallel to said extensional direction.

9. The method of claim 8, wherein said coordinate displacement has a magnitude in the range from 1 to 10 pixels.

10. The method of claim 1, wherein said at least two groups include a first group of pixels corresponding to a corner of a feature in a first region of the pattern and a second group of pixels corresponding to a corner of a feature in a second region of the pattern.

11. The method of claim 1, wherein the patterned surface is a mask, and wherein the reference data is a database of information corresponding to a design of the pattern.

12. The method of claim 1, wherein the patterned surface is a die formed on a wafer.

13. The method of claim 1, wherein the reference data is obtained by generating an image of a similar sample region.

14. A method for inspecting a patterned surface having a pattern which corresponds substantially to a set of reference data, the method comprising:

(a) generating a multilevel pixel image of at least one region of the pattern;

(b) processing the reference data corresponding to the at least one region of the pattern to identify at least one group of pixels within said multilevel pixel image, which is expected to be invariant under a given pixel displacement vector; and (c) comparing the at least one group of pixels from the multilevel pixel image with pixels related thereto by said pixel displacement vector.

15. The method of claim 14, wherein said processing includes an erosion operation to exclude from said at least one group of pixels a subset of said pixels which are expected to be invariant under said given pixel displacement vector.

16. The method of claim 14, wherein said processing is performed to identify pixels which are expected to be invariant under both addition and subtraction of said displacement vector, and wherein said comparing includes comparing each of the at least one group of pixels from, the multilevel pixel image with pixels related thereto by both addition and subtraction of said displacement vector.

17. The method of claim 14, wherein said steps of processing and comparing are repeated for each of a plurality of pixel displacement vectors in different directions.

18. The method of claim 17, wherein said comparing selectively generates a potential defect output when grayscale levels of said pixels differ by more than a defined threshold value, the method further comprising:

(a) identifying a symmetry count corresponding to a number of said displacement vectors under which a pixel is expected to be invariant;

(b) generating a potential defect count corresponding to a number of potential defect outputs generated for said pixel; and (c) applying a defect determination criterion employing both said symmetry count and said potential defect count to generate a binary defect output for said pixel.

19. The method of claim 18, wherein said plurality of pixel displacement vectors include displacement vectors in at least four different directions.

20. The method of claim 18, wherein said plurality of pixel displacement vectors include displacement vectors in eight different directions.

21. The method of claim 14, wherein said pixel displacement vector has a magnitude in the range from 1 to 10 pixels.

22. The method of claim 14, wherein said steps of processing and comparing are repeated for each of a plurality of pixel displacement vectors of different magnitudes in a given direction.

23. The method of claim 14, wherein said generating a multilevel pixel image is performed by an imaging system having a data output rate, and wherein at least said steps of processing and comparing are performed at a rate limited by said data output rate.

24. The method of claim 14, further comprising employing the reference data to generate a threshold value for each pixel from said group of pixels, wherein said comparing is performed by comparing a magnitude of a difference between grayscale levels of said pixels with a corresponding threshold value.

25. The method of claim 24, wherein said threshold value for a pixel varies as a position dependent function.

26. A method for inspecting a patterned surface having a pattern which corresponds substantially to a set of reference data, the method comprising:

(a) processing the reference data to identify regions of the pattern within said patterned surface, which include defined features;
(b) classifying said regions by use of the reference data into sets of regions containing comparable occurrences of said defined features which are expected to be similar according to predefined criteria;
(c) obtaining multilevel pixel images of a plurality of said regions which contain said comparable occurrences; and
(d) comparing said multilevel pixel images for said comparable occurrences.

27. The method of claim 26, wherein said comparing includes:
(a) employing a measure of deviation between multilevel pixel images to derive statistical data relating to said images of comparable occurrences of said defined features; and
(b) applying a significance criterion to said statistical data to identify features which differ in a statistically significant manner from said comparable occurrences of said defined features.

* * * * *